United States Patent [19]

Zelahy et al.

[11] 4,326,833
[45] Apr. 27, 1982

[54] METHOD AND REPLACEMENT MEMBER FOR REPAIRING A GAS TURBINE ENGINE BLADE MEMBER

[75] Inventors: John W. Zelahy, West Chester; Alexander Raeburn, Jr., Fairfield, both of Ohio

[73] Assignee: General Electric Company, Cincinnati, Ohio

[21] Appl. No.: 131,606

[22] Filed: Mar. 19, 1980

[51] Int. Cl.³ .................................................. F01D 5/14
[52] U.S. Cl. ........................... 416/96 R; 29/156.8 H; 29/402.13; 416/213 R; 416/232
[58] Field of Search ............... 416/96 R, 97 R, 213 R, 416/224, 232; 29/156.8 B, 156.8 H, 402.08, 402.13; 228/119

[56] References Cited

U.S. PATENT DOCUMENTS

| 3,275,295 | 9/1966 | Caldwell et al. | 416/224 |
| 3,394,918 | 7/1968 | Wiseman | 416/241 R |
| 3,574,924 | 4/1971 | Dibble | 416/224 X |
| 4,214,355 | 7/1980 | Zelahy | 29/156.8 B |

FOREIGN PATENT DOCUMENTS 54-106708  8/1979  Japan .................... 416/224

OTHER PUBLICATIONS

Technical Report AFML TR-73-166-Jul. 1973, Metals Branch, Manufacturing Tech. Div., AFML, Air Force Systems Command, USAF, WPAFB, Ohio 45433.

Primary Examiner—Leonard E. Smith
Attorney, Agent, or Firm—Lee H. Sachs; Derek P. Lawrence

[57] ABSTRACT

A gas turbine engine air cooled blade member which includes a base, an airfoil and a platform therebetween generally extending beyond the airfoil, the airfoil including leading and trailing edge portions at least one of which has an edge chamber extending longitudinally of the airfoil and extending chordwise into the airfoil toward the other edge to a longitudinally extending chamber wall is repaired by removing from the blade member at least one blade segment which comprises an edge portion, a part of the chamber wall, and a part of the platform connected with and extending from the edge portion and connected with the chamber wall. This provides for each edge portion removed a first alignment and bonding surface on the blade member remaining. Such alignment and body surface is cleaned to remove surface oxides. There is provided for use in such a repair method, as a replacement for the blade segment removed, a replacement member of substantially the same type of material and of a size and shape which matches the removed blade segment. The replacement member includes a second alignment and bonding surface which matches the first alignment and bonding surface of the blade segment which it replaces. Thereafter, the matched alignment and bonding surfaces are placed into registry and the replacement member is metallurgically bonded to the blade member at such surfaces.

4 Claims, 2 Drawing Figures

METHOD AND REPLACEMENT MEMBER FOR REPAIRING A GAS TURBINE ENGINE BLADE MEMBER

CROSS-REFERENCE TO RELATED APPLICATIONS

This application is related to Application Ser. No. 131,607, Cohen et al for "Method and Replacement Member for Repairing a Gas Turbine Engine Vane Assembly", filed concurrently herewith.

BACKGROUND OF THE INVENTION

1. Field of the Invention

This invention relates to gas turbine engine air cooled blade members and, more particularly, to an improved method and replacement member for repairing such a member in the area of its edge portions.

2. Description of the Prior Art

Blade members used in the turbine section of gas turbine engines experience strenuous operating conditions including a combination of mechanical stresses, thermal stresses and rotational stresses resulting from rapid spinning in the hot gas stream. As a result, such blade members have been designed to be air cooled to enable utilization of increased material properties. A variety of such blade members have been described in the art, one example of which is U.S. Pat. No. 3,628,885-Sidenstick et al patented Dec. 21, 1971, assigned to the assignee of the present invention and the disclosure of which is incorporated herein by reference. These types of blade members include a hollow interior portion enclosed by walls, some of which include openings to allow cooling air to exit from within the hollow interior of the blade member. In addition, such air cooled blade members include edge chambers, such as along the leading edge or trailing edge or both, extending along the length of the airfoil and extending chordwise into the airfoil toward the other edge to a longitudinally extending chamber wall which separates the edge chamber from the interior of the blade member.

As is shown in the above-incorporated Sidenstick et al patent and as can be appreciated from this kind of art, such blade members are complex in design and are relatively costly to manufacture. Therefore, it is desirable to repair rather than to replace such blade members which have been worn or damaged during gas turbine engine operation. For example, it has been recognized that a substantial portion of such wear or damage can occur at the leading edge wall by a combination of occurrences as impingement and thermal cracking, as well as at the trailing edge portions such as results from thermal cracking. Although repair of such a blade member has been made by fusion welding, such repair method has limitations because of distortion because of welding. In addition, recracking of the repair welds has been experienced in some instances. Other reported repair methods include that described in U.S. Pat. No. 4,098,450-Keller et al, patented July 4, 1978 assigned to the assignee of the present invention, the disclosure of which is incorporated herein by reference. Such repair method, however, is difficult to use with blade members which have experienced extensive damage and sometimes loss of substantial portions of the leading or trailing edges or both.

SUMMARY OF THE INVENTION

One object of the present invention is to provide an improved method for repairing a gas turbine engine air cooled blade member which does not employ fusion welding.

Another object is to provide such an improved method in which a segment of the blade member is removed from the airfoil and from the platform, including a portion of a wall within the hollow interior of the blade to provide a positive alignment and orientation surface for a replacement member for the airfoil edge being repaired.

Still another object is to provide an improved blade replacement member for use in the repair of such an air cooled blade member.

These and other objects and advantages will be more fully understood from the following detailed description of the preferred embodiments and the drawing all of which are intended to be typical of rather than in any way limiting on the scope of the present invention.

Briefly, one form of the method associated with the present invention relates to the repair of a gas turbine engine air cooled blade member which includes a base, an airfoil and a platform therebetween, generally extending beyond the airfoil. The airfoil projects longitudinally from the platform and has chordwise spaced leading and trailing edge portions connected by concave and convex sidewalls. At least one of the edge portions has an edge chamber extending longitudinally of the airfoil and extending chordwise into the airfoil toward the other edge portion. Such chordwise extension is to a longitudinally extending chamber wall. The method includes the steps of removing from the blade member at least one blade segment which comprises the edge portion, a part of the chamber wall, preferably planar, connected with and facing the edge portion, and a pair of the platform, preferably planar, connected with and extending from the edge portion and connected with the chamber wall. Thus there is provided for the blade member on the surfaces at which the blade segment has been removed a first alignment and bonding surface. Such surfaces, which preferably are intersecting planar surfaces, are then cleaned to remove any surface oxides and other contaminants. There is provided for use in such a repair method, as a replacement for such blade segment, a replacement member of substantially the same type of material and of a size and shape which matches the removed blade segment, the replacement member including a second alignment and bonding surface which matches the first alignment and bonding surface remaining on the blade member. The first and second alignment and bonding surfaces are placed into registry and the replacement member is metallurgically bonded with the blade member at the locating and bonding surfaces through a non-fusion method. Thus the replacement member comprises a longitudinal portion comprised of the edge portion and a part of the chamber wall, and a foot portion comprised of the platform.

DESCRIPTION OF THE PREFERRED EMBODIMENTS

Figure 1:
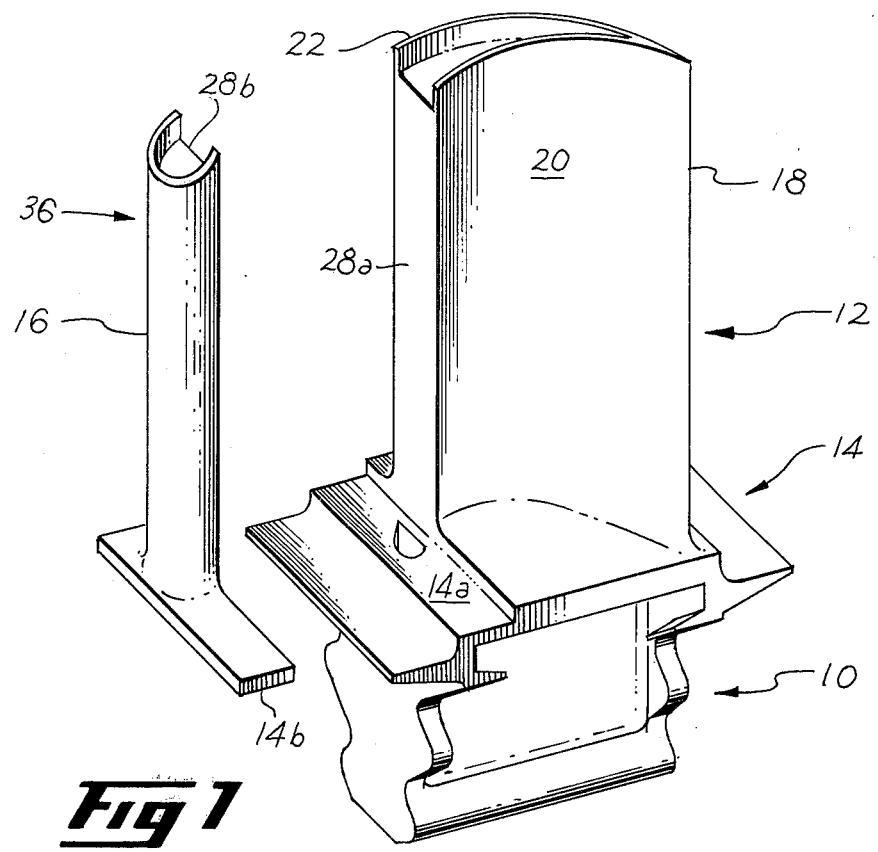
FIG. 1 is a perspective view of a gas turbine engine air cooled blade member including an exploded view of a replacement member.

In the following description and in the drawing, like reference numerals will be used to identify like parts. In the drawing, the blade member includes a base shown generally at 10, an airfoil shown generally at 12 and a platform therebetween, shown generally at 14 and extending generally beyond the airfoil. The airfoil 12, which projects from platform 14, includes chordwise spaced leading and trailing edge portions 16 and 18, respectively, interconnected by concave and convex sidewalls 20 and 22, respectively, shown particularly in FIG. 1. Included within airfoil 12 are edge chambers, for example, leading edge chamber 24 and trailing edge chamber 26. Leading edge chamber 24 is separated from the balance of the interior portion of the airfoil by leading edge chamber wall 28. Similarly, trailing edge chamber 26 is separated from the balance of the interior of the airfoil by a trailing edge chamber wall 30, shown more particularly in FIG. 2.

Generally, cooling fluid openings are provided in walls of the airfoil, for example, as shown in the above-incorporated U.S. Pat. No. 3,628,885-Sidenstick et al. However, such openings are not described here for simplicity of presentation and because they form no part of the present invention.

During operation of such an air cooled blade member in a gas turbine engine, wear, damage, thermal cracking, etc. to the airfoil leading and trailing edge portions can occur. The present invention for repairing such damage will be described here in connection with replacement of the leading edge portion although it should be understood that repair of the trailing edge portion can be accomplished similarly, alone or in combination with repair of the leading edge portion.

Although replacement of the edge portions such as the leading edge portion of such a blade member has been attempted, problems relating the positive alignment and orientation of replacement members have precluded practical application of such a method. The present invention, however, provides for a positive alignment and orientation of a replacement member through the use of undamaged portions of the blade member: a portion of the edge chamber wall, such as 28 for the leading edge and 30 for the trailing edge, and a portion of platform 14 adjacent the respective edge being repaired to provide a foot portion for a replacement member.

Figure 2:
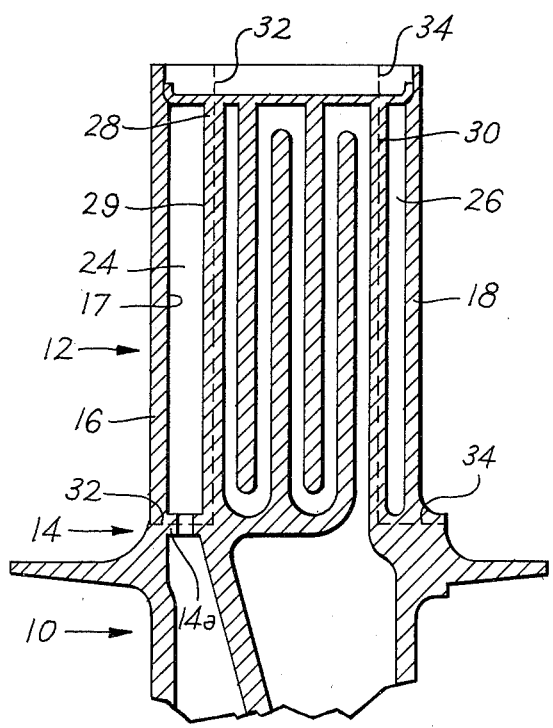
FIG. 2 is a fragmentary sectional view of the blade of FIG. 1.

According to the method of the present invention, there is removed from the blade member a blade segment, for example, for the leading edge portion shown in the drawing. The segment comprises the edge portion, a part of the chamber wall facing the edge portion, for example, the forward wall represented at 28b for the leading edge, and a part of the platform 14 such as is represented at 14b which is connected with the respective edge portion and chamber wall. With reference to FIG. 2, broken line 32 defines the substantially planar surfaces of the blade segment removed from the leading edge portion and broken line 34 defines the substantially planar surfaces of the blade segment removed from the trailing edge portion according to the present invention. Such a blade segment can be removed by material removal methods as grinding, mechanical machining, electrodischarge machining etc. Remaining after such removal of a blade segment is an inner part of the chamber wall, for example, an aft planar part of the chamber wall 28a, and a lower surface of the platform, for example substantially planar surface 14a, connected with chamber wall portion, for example wall 28a as shown in FIG. 1. Together, such remaining chamber wall and platform surfaces define a first alignment and bonding surface on the blade member remaining after removal of the blade segment. After such removal, the alignment and bonding surface is cleaned to remove surface oxides and other contaminants which might remain after removal of the blade segment, to enable metallurgical bonding, such as diffusion bonding to be conducted.

A replacement member for such removed blade segment, shown generally at 36 in FIG. 1, is provided such as by precision casting, for example, using the "lost-wax" process, by machining from another blade, etc., and appropriately cleaned to prepare it for metallurgically bonding. Such a replacement member is of substantially the same type of material and of a size and shape which matches the removed blade segment, for example, as shown in FIG. 1. Leading edge replacement member 36 includes a longitudinal portion defined by a replacement leading edge portion 16 and a replacement chamber forward wall portion 28b and a foot portion comprising replacement upper platform portion 14b. The interior surface 17 of leading edge portion 16 is connected with surface 29 of wall 28 and together define walls of edge chamber 24. The substantially planar surfaces of portions 14b and 28b together define a second alignment and bonding surface which matches the first alignment and bonding surface defined by substantially planar surfaces 14a and 28a.

According to the method of the present invention, replacement member 36 is assembled with the remainder of the blade member so that surfaces at 14a and 14b are in registry as are surfaces at 28a and 28b to positively align and orient replacement member 36 with the balance of the blade member. Thereafter, the first and second alignment and bonding surfaces are metallurgically bonded together to provide a repaired blade member. Such metallurgical bonding can be accomplished in a variety of ways, for example, in accordance with the above-incorporated Keller et al U.S. Pat. No. 4,098,450 across a narrow juncture or crevice between the alignment and bonding surfaces, by vacuum brazing, by hot isostatic pressing, by diffusion bonding, etc. As was mentioned before, it has been recognized that fusion-type joining, such as fusion welding, can result in the creation or retention of stresses in the vacinity of the juncture between the replacement member and the balance of the blade member being repaired. Ultimately, such stresses can result in cracking as well as distortion. Therefore, as used herein, the term "metallurgical bonding" is intended to exclude from its meaning fusion-type joining processes.

Used in one evaluation of the present invention was a blade member currently used in a commercial gas turbine engine. Such a member was made of a nickel base superalloy sometimes referred to as Rene' 80 alloy and more fully described in U.S. Pat. No. 3,615,376-Ross, assigned to the assignee of the present invention, the disclosure of which is incorporated herein by reference. A leading edge blade segment was removed from the blade member by grinding along a plane represented by line 32 shown in FIG. 2 with substantially planar chamber wall 28a and platform wall 14a remaining as a first alignment and bonding surface on the blade member. Then there was provided a Rene' 80 alloy leading edge replacement member to a size and shape which matched the removed blade segment. Such a member conveniently is provided by precision casting using the "lost-wax" process, although it can be provided by machining from another blade such as a scrap blade. Such a replacement member of the type shown at 36 in FIG. 1 included a chamber wall surface 28b and a platform wall surface 14b which matched respectively with surface 28a and 14a and which defined a second alignment and bonding surface on the replacement member. After cleaning the first and second alignment and bonding surfaces, leading edge replacement member 36 was assembled with the balance of the blade member to place the first and second alignment and bonding surfaces into registry. Thereafter, such alignment and bonding surfaces were metallurgically bonded by a method sometimes referred to as Activated Diffusion Bonding and more fully described in U.S. Pat. No. 3,632,319-Hoppin et al, patented Jan. 4, 1972, assigned to the assignee of the present invention. Also used in this evaluation was a nickel-base bonding foil of a composition more particularly described in U.S. Pat. No. 3,759,692-Zelahy, assigned to the assignee of the present invention. The disclosures of each of these patents is incorporated herein by reference.

Because most blade members being repaired according to the present invention are the type which had been operated in a gas turbine engine, generally additional cleaning steps are employed to remove surface contamination and coatings such as were applied for oxidation and sulfidation resistance.

Although the present invention has been described in connection with specific embodiments and examples, for example, particularly in connection with leading edge blade member repair, it will be recognized by those skilled in the art that various modifications and variations are possible within the scope of the present invention which is intended to be encompassed by the appended claims.

What is claimed is:

1. In a method for repairing a gas turbine engine air cooled blade member which includes a base, an airfoil and a platform therebetween generally extending beyond the airfoil, the airfoil projecting longitudinally from the platform and having chordwise spaced leading and trailing edge portions interconnected by concave and convex sidewalls, at least one edge portion having an edge chamber extending longitudinally of the airfoil and extending chordwise into the airfoil toward the other edge portion to a longitudinally extending chamber wall, the steps of:

removing from the blade member a blade segment comprising the edge portion, a part of the chamber wall connected with and facing the edge portion, and a part of the platform connected with and extending from the edge portion and connected with the chamber wall to provide a first alignment and bonding surface on the blade member remaining;

cleaning the first alignment and bonding surface to remove surface oxides;

providing a replacement member of substantially the same type of material and a size and shape which matches the removed blade segment, the replacement member including a chamber wall and a platform wall which together define a second alignment and bonding surface which matches the first alignment and bonding surface;

placing the first and second alignment and bonding surfaces into registry at their respective wall and platform surfaces; and then metallurgically bonding the replacement member with the blade member at the locating and bonding surfaces.

2. The method of claim 1 in which:

the blade segment is removed to provide on the remaining blade member substantially planar surfaces on the chamber wall and on the platform to provide a first alignment and bonding surface including predominantly intersecting planar surfaces; and the second alignment and bonding surface on the replacement member is provided with predominantly intersecting planar surfaces which match the first alignment and bonding surface.

3. A replacement member for a segment of a gas turbine engine air cooled blade, the blade including a base, an airfoil and a platform therebetween generally extending beyond the airfoil, the airfoil projecting longitudinally from the platform and having chordwise spaced leading and trailing edge portions interconnected by concave and convex sidewalls, at least one edge portion having an edge chamber extending longitudinally of the airfoil and extending chordwise into the airfoil toward the other edge portion to a longitudinally extending chamber wall, the replacement member comprising:

a longitudinal portion including
  (a) an edge portion; and
  (b) a part of the chamber wall connected with and facing the edge portions;
  (c) the edge portion and an interior surface of the chamber wall part facing the edge portion defining walls of the edge chamber; and a foot portion connected with the longitudinal portion and comprising a part of the platform connected with and extending from the edge portion and connected with the edge chamber.

4. The replacement member of claim 3 in which:

the part of the chamber wall connected with and facing the edge portion includes an exterior surface which is substantially planar; and the part of the platform of the foot portion includes a surface remote from the longitudinal portion and which is substantially planar and interconnecting with the substantially planar exterior surface of the part of the chamber wall.

* * * * *